United States Patent [19]

Chang

[11] Patent Number: 5,827,428
[45] Date of Patent: Oct. 27, 1998

[54] FILTERED WATER DRAIN FOR A SPILLAGE COLLECTOR ON A PURIFIED WATER DISPENSER

[75] Inventor: Beung-Kwon Chang, Suwon, Rep. of Korea

[73] Assignee: Samsung Electronics Co., Ltd., Suwon, Rep. of Korea

[21] Appl. No.: 854,818

[22] Filed: May 12, 1997

[30] Foreign Application Priority Data

May 25, 1996 [KR] Rep. of Korea .................... 96-17899

[51] Int. Cl.$^6$ .................................................. B01D 35/027
[52] U.S. Cl. .................. 210/248; 210/257.2; 210/460; 210/501; 222/108; 222/189.06
[58] Field of Search ................... 210/248, 257.1, 210/459, 460, 497.01, 497.3, 499, 257.2, 501; 222/108, 146.1, 146.6, 189.06, 189.1, 189.11

[56] References Cited

U.S. PATENT DOCUMENTS

| | | |
|---|---|---|
| 1,393,555 | 10/1921 | Lockyer .................................. 210/460 |
| 2,210,846 | 8/1940 | Aghnides ............................... 210/460 |
| 3,495,714 | 2/1970 | Barton ..................................... 210/460 |
| 3,960,733 | 6/1976 | Van Dieren ............................. 210/460 |
| 3,995,770 | 12/1976 | Schwitters ........................... 222/189.1 |
| 4,651,862 | 3/1987 | Greenfield, Jr. .................. 222/189.06 |
| 4,908,904 | 3/1990 | Smith, Jr. ................................ 222/189 |
| 5,135,645 | 8/1992 | Sklenak et al. ......................... 210/439 |
| 5,322,625 | 6/1994 | Rise ....................................... 210/248 |
| 5,405,526 | 4/1995 | Sutera .................................... 210/469 |
| 5,464,533 | 11/1995 | Koslow ................................ 210/257.1 |
| 5,478,465 | 12/1995 | Larson et al. ....................... 210/257.1 |
| 5,492,250 | 2/1996 | Sardynski ............................... 222/108 |
| 5,573,142 | 11/1996 | Morellato et al. .................. 222/146.1 |
| 5,679,243 | 10/1997 | Cho ..................................... 210/257.1 |

*Primary Examiner*—W. L. Walker
*Attorney, Agent, or Firm*—Burns, Doane, Swecker & Mathis, L.L.P.

[57] ABSTRACT

A water dispenser includes a housing in which a tank is disposed for containing purified water. A valve is disposed at a front of the housing for enabling a user to dispense the purified water. A water collecting tub is disposed beneath the valve for collecting spilled water. A drainage hose communicates with a lower portion of the tub for draining-away collected water. A removable filter is removably mounted across an inlet of the drainage passage for filtering-out foreign substances that might otherwise block the drainage hose.

7 Claims, 6 Drawing Sheets

FILTERED WATER DRAIN FOR A SPILLAGE COLLECTOR ON A PURIFIED WATER DISPENSER

BACKGROUND OF THE INVENTION

1. Field of the Invention

The present invention relates to a spilled water collector/drain for a water dispenser.

2. Description of the Prior Art

A conventional water dispenser functions to remove undesirable foreign substances contained in tap water through filtering means. Such a conventional cold/hot water purifier is generally classified into a natural filtering type, a forced filtering type, an ion exchanging resin type and a reverse osmotic type in accordance with methods for purifying water. Water purifiers of the reverse osmotic type, which force tap water to pass through an artificial osmotic membrane (reverse osmotic filter) while applying pressure to the tap water, can remove heavy metals, bacteria, cancer-causing materials, and the like, contained in the water, thereby purifying the water. Since the reverse osmotic water purifiers can supply pure water containing only dissolved oxygen, they have been used in fields such as super-pioneering scientific industries, medical sciences or cleaning for super-precision electronic elements. Recently, such reverse osmotic water purifiers have widely been used as domestic water purifiers for supplying drinkable water.

FIGS. 1 to 3 illustrate a conventional reverse osmotic cold/hot water purifier including a purifier body 10. The body 10 has an upper front panel 11, a lower front panel 11a, a rear panel 12, a side panel 13, a top panel 14, and a bottom panel 15 integrally assembled each other.

Further, the body 10 has, as shown in FIGS. 2 and 3, first and second horizontal isolating members 20, 21 placed to form upper and lower spaces E, F of predetermined volumes, respectively, a vertical third isolating member 22 placed between the first and second isolating members 20, 21 so as to form a rear space G of a predetermined volume, and a horizontal fourth isolating member 23 placed between the first, second and third isolating members 20, 21, 22 so as to form two front upper and lower spaces H, I of predetermined volumes, respectively.

A purified water storage tank 30 of a predetermined volume is placed on a surface of the first isolating member 20 within the space E.

The upper front panel 11 is provided with a control panel 40 to carrying a main PCB 41 through which any operations for a product can selectively be made.

Referring again to FIGS. 2 and 3, the space F has a compressor 50 placed on the bottom panel 15, for compressing refrigerant at high temperature and high pressure, a condenser 60 placed on the bottom panel 15, for condensing the compressed refrigerant supplied from the compressor 50, and cooling means 70 located between the compressor and the condenser, for cooling the compressor 50 and condenser 60 which generate the compressing heat and condensing heat.

The space G has a plurality of filtering means 90 firmly supported therein, but adapted to be exchangeable for new ones as desired, by means of first and second filter supporting brackets 80, 81 which are installed at suitable positions on the rear surface of the third isolating member 22. A pressure pump 100 is installed on a surface of the second isolating member 21.

A plurality of filtering means 90 includes, as shown in FIG. 4, a precipitable filter 91 supported by the first filter supporting bracket 80, or removing floats such as rust, and the like, contained in tap water supplied from a water main (not shown), a pre-processing filter 92 supported by the first filter supporting bracket 80, for removing various harmful organic chemical substances such as chlorine components, and the like from the water supplied from the precipitable filter 91, first and second membrane filters 93, 94 supported by the first filter supporting bracket 80, for removing heavy metals, bacteria, cancer-causing materials, and the like, contained in the water, when passing through the pressure pump 100 from the pre-processing filter 82, a post-processing filter 95 supported by the first filter supporting bracket 80, for removing odorous substances, such as noxious gas, contained in the water emerging from both the membrane filters 93, 94, and a sterilizing filter 96 supported by the second filter supporting bracket 81, for sterilizing various harmful microorganisms contained in the water emerging from the post-processing filter 95 and for supplying it to the purified water storage tank 30.

These filters 91 to 96 and 100 are connected to each other through connecting hoses 97 for routing water flow.

Further, pipes 98 are connected to bottom portions of two membrane filters 93, 92, in order to externally discharge any unnecessary concentrated (waste) water which may be generated during the passage of water through the filters 93, 94.

On a surface of the fourth isolating member 23, there is provided a hot water storage tank 110 and a cold water storage tank 120 inside the space H, each of which receives a predefined amount of water through supplying pipes 31, 32, respectively, and is adapted to heat or cool the received water, respectively.

As shown in FIG. 3, the first water supplying pipe 31 has a top end connected to a bottom surface of the purified water storage tank 30, and a bottom end connected to the bottom surface of the hot water storage tank 110. The second water supplying pipe 32 has a top end connected to the bottom surface of the purified water storage tank 30, and a bottom end connected to a top surface of the cold water storage tank 120.

The hot water storage tank 110 also has a heating member 111 for heating the water stored therein when power supply is applied thereto. The cold water storage tank 120 has a spiral cooling coil 121 wound around an outer surface thereof, which coil 121 conducts cold refrigerant to cool the purified water in the storage tank 121. These tanks 110, 120 also have hot and cold water dispensing valves 130, 131, respectively, in order to discharge the hot or cold water contained in the respective tanks 110, 120. To this end, these valves 130, 131 are connected to water supplying pipes 112, 122 which are connected to the hot and cold water tanks 110, 120, respectively. The valves protrude from the upper front panel 11.

The space I has a box 140 containing electric facilities necessary for controlling the product operations, the box located on an upper surface of the second isolating member 21. Both sides of the box 140 are exposed. Any external access to the apparatus is permitted for maintenance of the apparatus as desired, through electronic circuitry included in the box 140.

Between the upper and lower front panels 11, 11a, there is provided a collector means 160 for collecting water discharged thereto from the hot and cold water dispensing valves 130, 131 and for draining the collected water.

As shown in FIG. 5, the collector means 160 has a tub 161 separably coupled to a drain hose 164, and a grille 162 seated on a top of the tub 161 which serves to prevent the dropped water from bouncing out of the tub. The tub 161 has a drainage pipe 161a outwardly extended from a rear side thereof, which serves to externally drain the water collected in the tub 161. The drain pipe 161a has on its outer surface the drain hose 161 coupled by means of an 0-ring 163.

However, the drainage hole 161a is always opened. Foreign substances contained in the water collected in the tub 161 thus directly flow into and block the drain hose 164.

SUMMARY OF THE INVENTION

Therefore, it is an object of the present invention to provide a water collector/drain for a water dispenser which drains spilled water without allowing any foreign substances to be drained so as to prevent the blockage of the drain.

The above objects are accomplished by a water dispenser having a water collector tub to which a drainage passage is connected to drain water received from water dispensing valves, characterized in that means for filtering foreign substances contained in the water is located at a predetermined position of the drainage passage in order to prevent a blockage of the drainage passage.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

Figure 1:
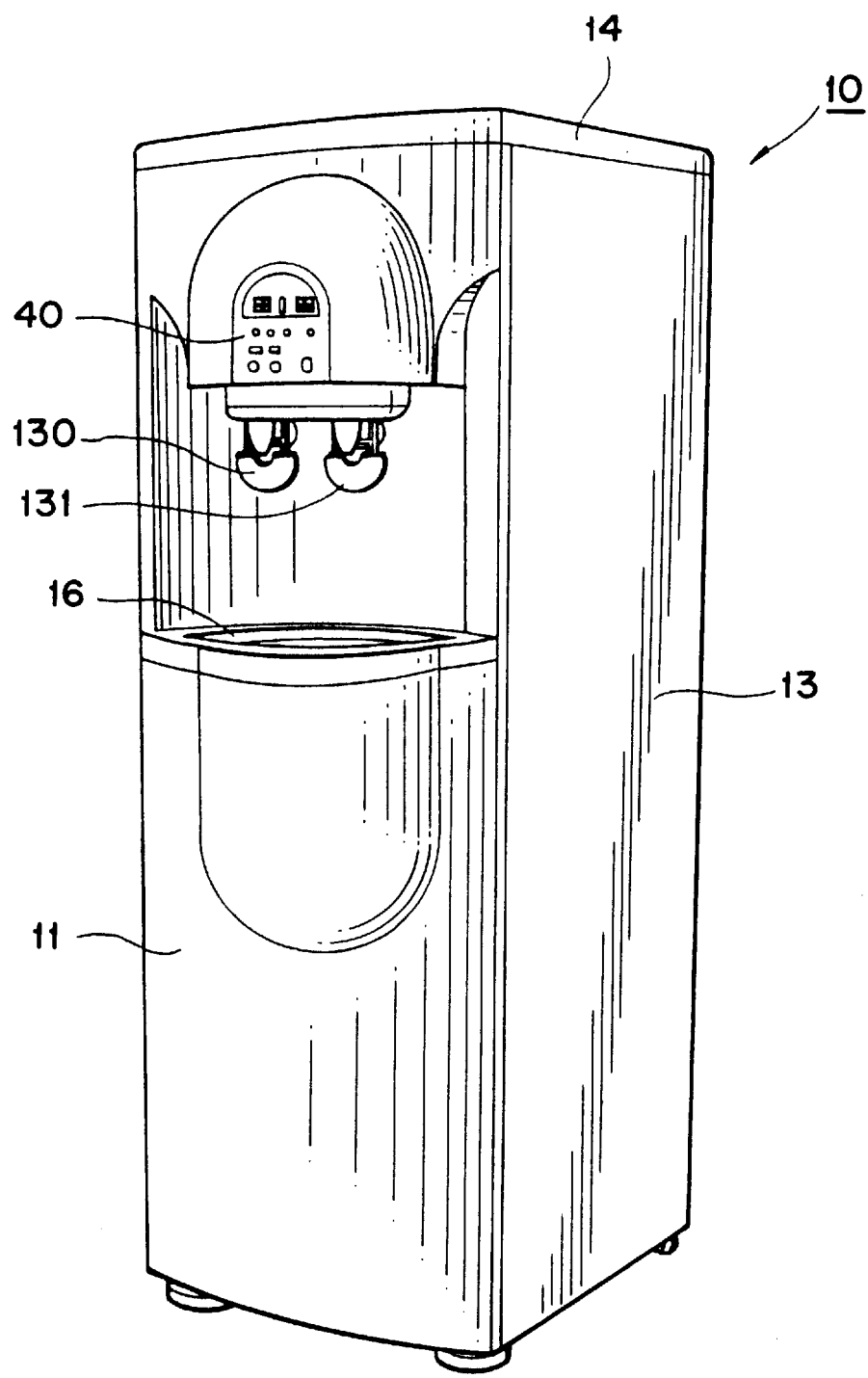
FIG. 1 is a schematic perspective view of a conventional water purifier.
Figure 2:
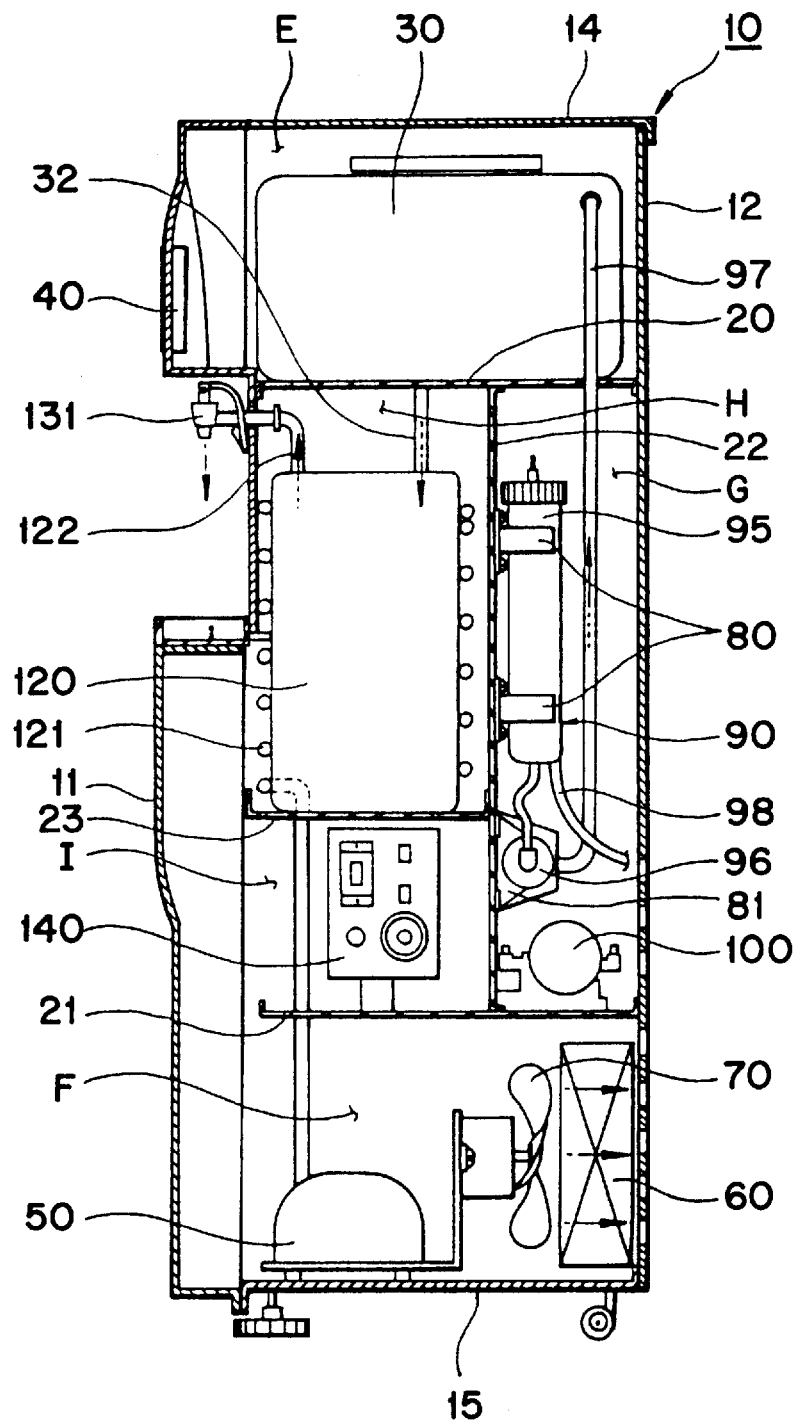
FIG. 2 is a side vertical cross sectional view of the conventional water purifier.
Figure 3:
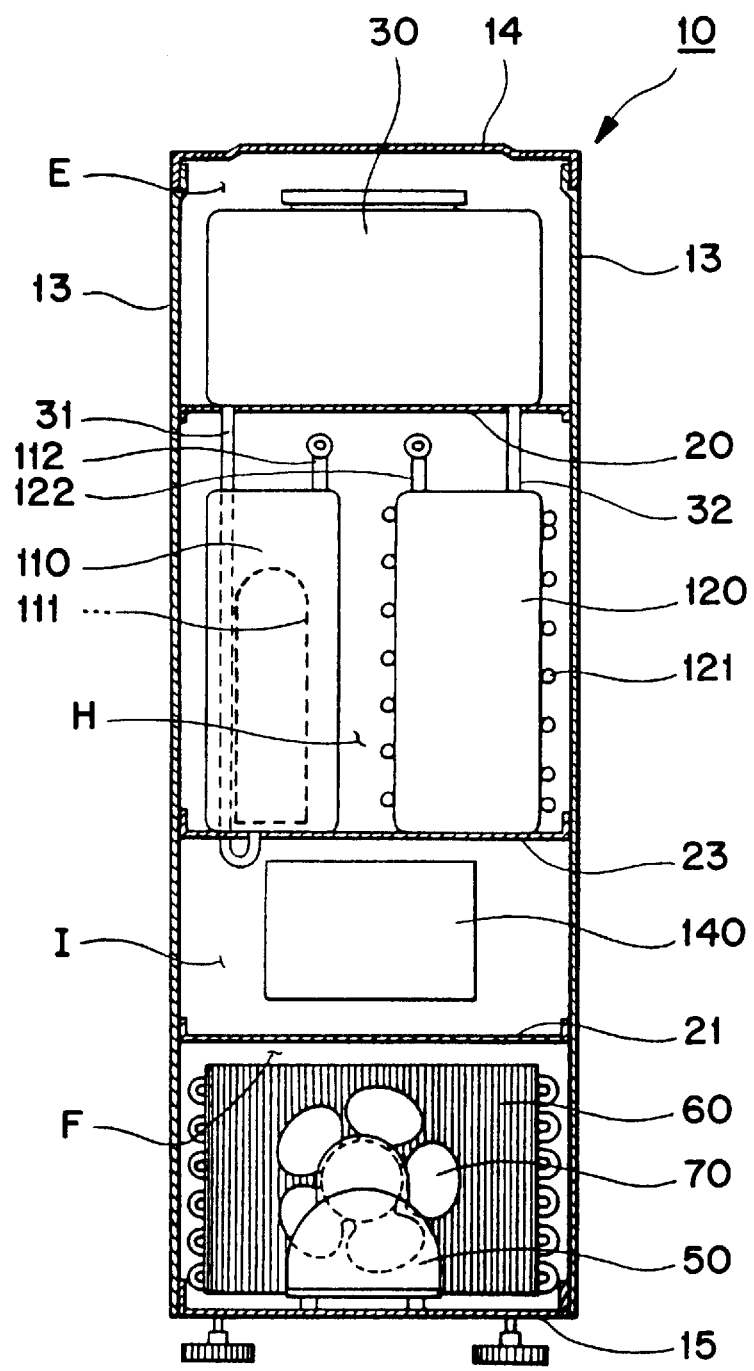
FIG. 3 is a front vertical cross sectional view of the conventional water purifier.
Figure 4:
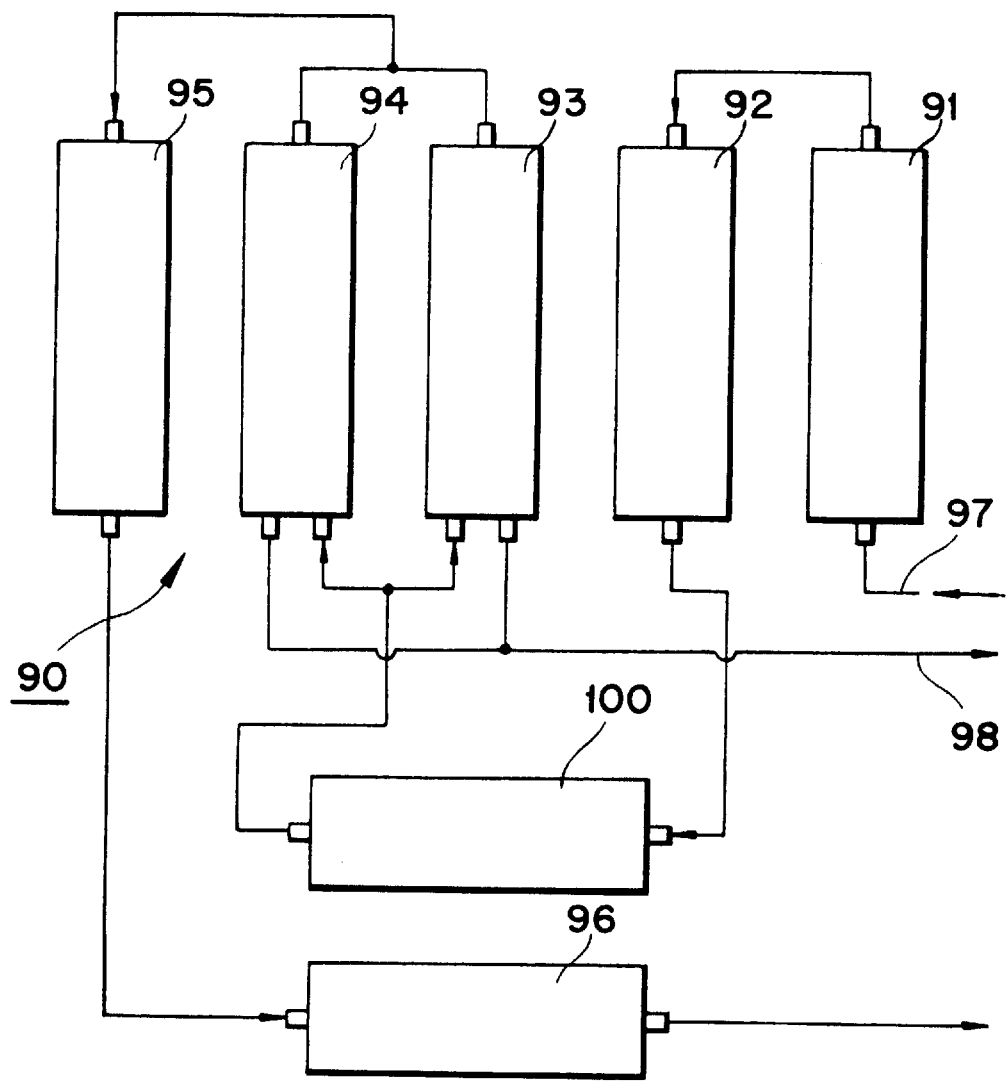
FIG. 4 shows an arrangement of various filtering means and pressure pump of the conventional water purifier.
Figure 5:
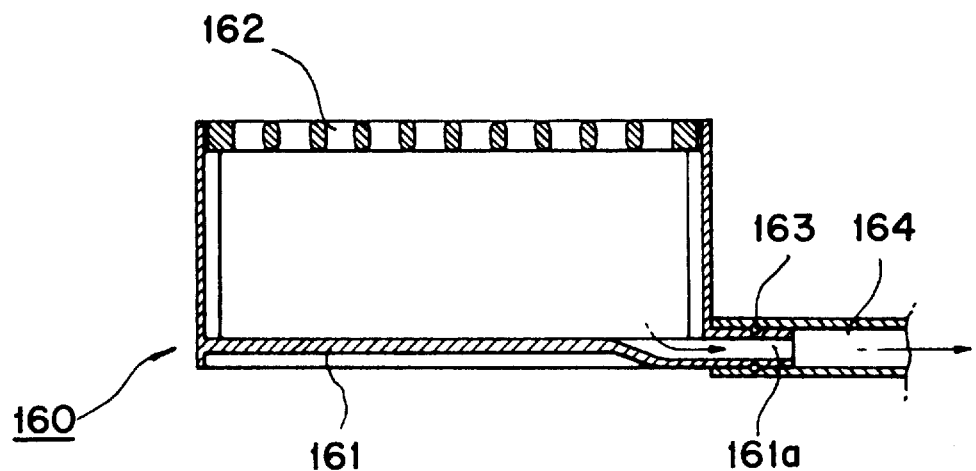
FIG. 5 is a vertical cross sectional view of a spilled water collector/drain of the conventional water purifier.

The preferred embodiment according to the present invention will now be described in detail in accordance with the accompanying drawings. Throughout the accompanying drawings, like parts are designated by like reference numerals or symbols whose further detailed descriptions will be omitted.

Figure 7:
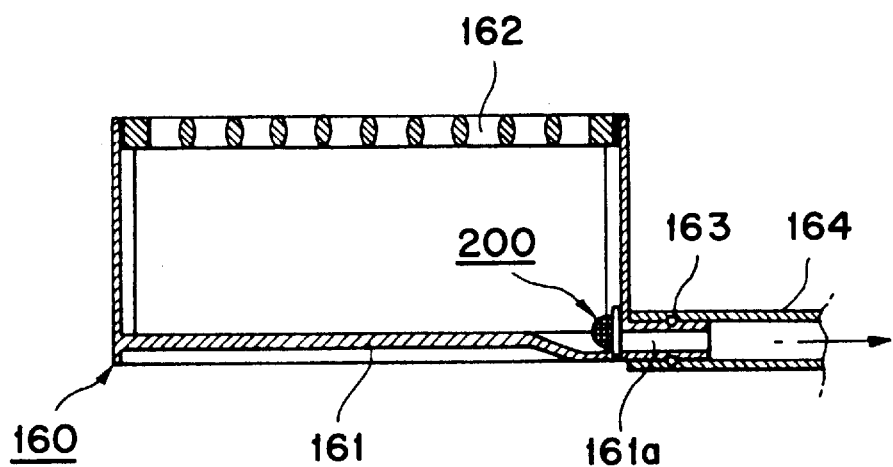
FIG. 7 is a vertical cross sectional view of the spilled water collector drain of FIG. 6.
Figure 6:
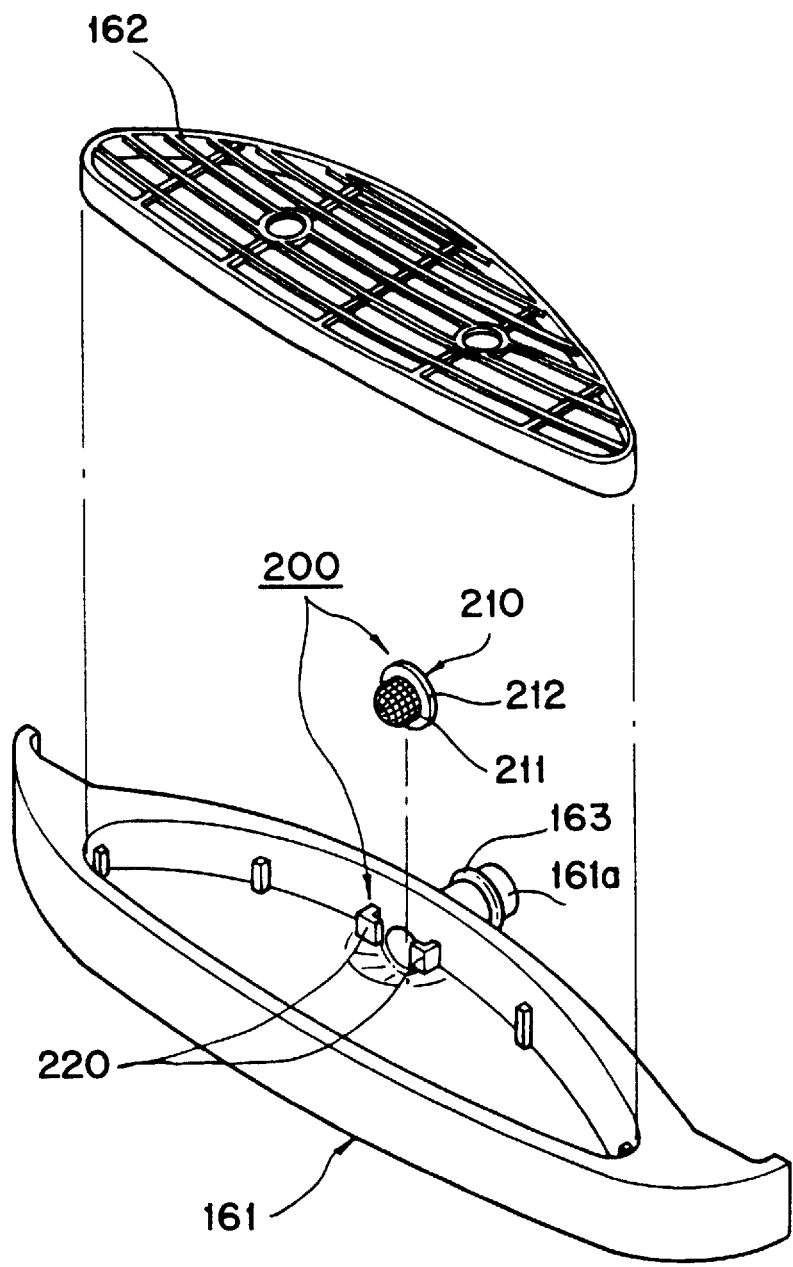
FIG. 6 is an exploded perspective view of a spilled water collector/drain according to the present invention.

In FIG. 6, reference numeral 200 denotes a filtering means disposed at a given location of a drainage passage 161a, for preventing a blockage of the drainage passage by filtering the water collected in the tub 161. The above filtering means 200 consists of, as shown in FIGS. 6 and 7, a filtering net 210, and left, right hooks 220 inwardly projecting from an entrance of the drainage passage 161a, for fixedly retaining the filtering net 210 in a vertical manner.

The filtering net 210 further consists of a mesh net 211 having its convex side facing away from the drainage passage 161a. A flange 212 is formed around a circumferential area of the mesh net 211.

In operation, a user manipulates keys (not shown) arranged on the control panel 40 located on the upper front side of the purifier body 10, for selecting desired operations of the water dispenser. In case the pressure pump 100 is activated in response to the key selection, tap water supplied from a water main passes through a plurality of filtering means 90 by virtue of both the water pressure loaded from the water main and a pressure treated by the energized pressure pump 100, and then produces the purified water.

More specifically, floats such as rust, and the like, contained in tap water supplied from the water main (not shown) are removed while the tap water passes through the precipitable filter 91. Various harmful organic chemical substances such as chlorine components, and the like in the water emerging from the precipitable filter 91 are removed by a pre-processing filter 92, and heavy metals, bacteria, cancer-causing materials, and the like, contained in the water are removed by the first and second membrane filters 93, 94.

Subsequently, odorous substances, such as noxious gas, contained in the water emerging from both membrane filters 93, 94 are removed by the post-processing filter 95, and then various harmful microorganisms contained in the water emerging from the post-processing filter 95 are sterilized by the sterilizing filter 96. The water fully purified through various filters is then supplied to the purified water storage 30.

The water stored in the purified water storage tank 30 is supplied to each of the hot and cold water tanks 110, 120 by way of the first and second water supplying pipes 31, 32 connected to the bottom surface of the purified water storage tank 30. The water flowing through the first water supplying pipe 31 continues to be supplied to the hot water storage tank 110 until that tank is full. The water flowing through the second water supplying pipe 32 continues to be supplied to the cold water storage tank 120 until that tank is full. A full water level in tank 30 is sensed by a water level sensor (not shown) installed on a side of the purified water storage tank 30. The pressure pump 110 stops when any signal from the sensor indicating the full water level is present.

If the heater member 111 provided in the hot water storage 110 is energized by electric current the temperature of the water contained in tank 110 is raised.

The chilling of the cold water is effected through an activation of the compressor 50 which produces refrigerant gas at high temperature and high pressure which is fed to the condenser 60. The refrigerant gas in the condenser 60 is condensed by an air blown by the cooling means 70.

The condenser 60 changes the refrigerant gas into liquid refrigerant having a high pressure and temperature almost higher than the water dispenser temperature. The liquid refrigerant enters a capillary (not shown) to become lower in pressure. Depressurized liquid refrigerant is introduced into the cooling coil 121 wound around an outer surface of the cold water storage tank 120, and is expanded there. This results in the vaporizing of expanded refrigerant at low temperature and pressure, which consequently causes a cooling to be achieved. A cooling cycle as described above cools the water stored in the cold water storage 120.

A user may desire to take either hot or cold water in the respective tanks 110, 120 using a receptacle like a cup (not shown) and then places the receptacle in contact with a water taking lever of one of the valves 130 and 131 so as to push it. The pushing action causes the lever to be backwardly swung, thereby opening the passageway of the water dispensing valve 130 or 131. The hot or cold water in the respective storage tank 110, 120 is discharged into the receptacle from the water supplying pipe 112 or 122 and the water dispensing valve 130 or 131 whose passageway is opened.

At this time, some of the supplied water may spill into the tub 161 during dispensing of the selected hot or cold water, or a user may pour some water from the receptacle into the tub 161. The collected water in the tub 161 flows towards the drainage passage 161*a* due to the inclined bottom surface of the tub 161. The water passing through the drainage passage 161*a* is externally drained along drain hose 164.

Foreign substances contained in the water to be drained are intercepted by the filtering net 210 of the filtering means 200, and therefore cannot be passed through the drainage passage 161*a*. This prevents a blockage of the drainage passage which may otherwise be caused by the foreign substances.

What is claimed is:

1. A purified water dispenser comprising:
    a housing having a water inlet;
    a filtering section comprising a plurality of filtering devices interconnected in series for receiving and purifying water received from the water inlet;
    at least one tank disposed in the housing for receiving purified water from the filtering section;
    a manually actuable valve mounted in an accessible position on a front of the housing, the valve connected to the tank for dispensing purified water therefrom;
    a tub mounted on the front of the housing beneath the valve for collecting spilled water;
    a drainage hose connected to a lower portion of the tub for draining the collected water therefrom; and
    a filter arranged at the inlet of the drainage hose to prevent foreign substances from draining through the drainage hose.

2. The water dispenser according to claim 1 wherein the filtering devices include a membrane filter and a sterilizing filter.

3. The water dispenser according to claim 1 wherein the filter is removable.

4. The water dispenser according to claim 1 wherein the tub includes an inside surface, and a filter retainer structure projecting inwardly from the inside surface adjacent the inlet of the drainage hose, the filter being removably mounted in the filter retainer structure.

5. The water dispenser according to claim 4 wherein the filter comprises a flange and a net mounted to the flange, the flange being retained by the filter retainer structure.

6. The water dispenser according to claim 5 wherein the filter retainer structure comprises two hook-shaped retainers horizontally spaced apart on opposite sides of the inlet, the retainers together forming a vertical channel in which the flange is vertically slidable.

7. The water dispenser according to claim 6 wherein the net includes a convex surface facing away from the inlet.

* * * * *